L. J. CAMPBELL.
VARIABLE SPEED TRANSMISSION MECHANISM.
APPLICATION FILED DEC. 8, 1919.
1,394,607.
Patented Oct. 25, 1921.
2 SHEETS—SHEET 1.
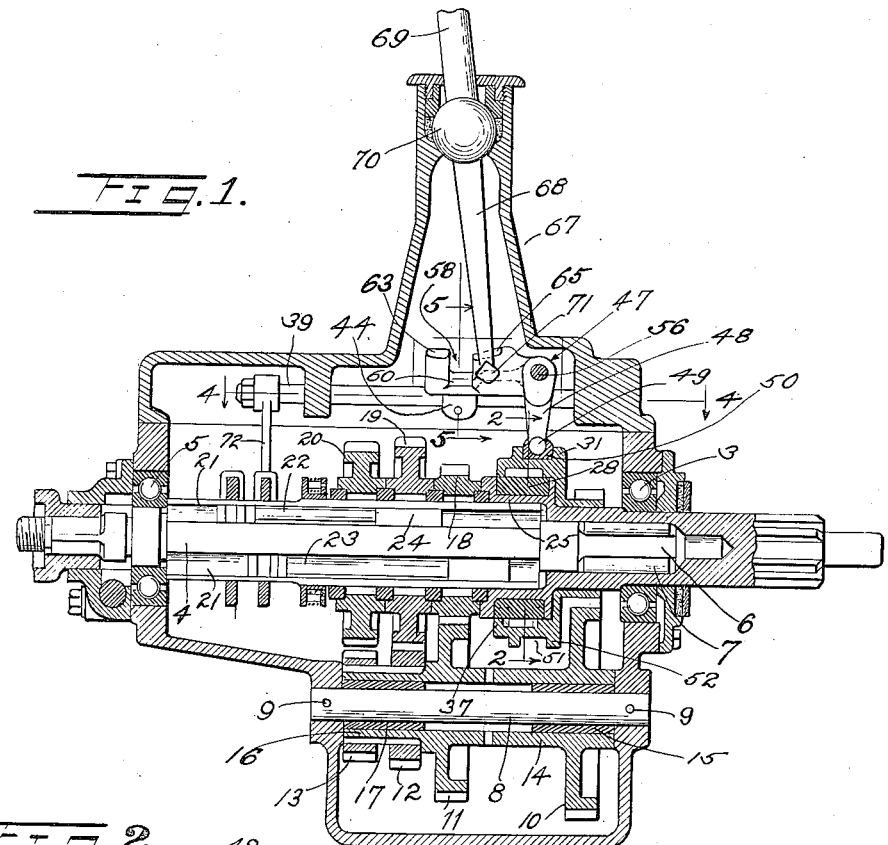
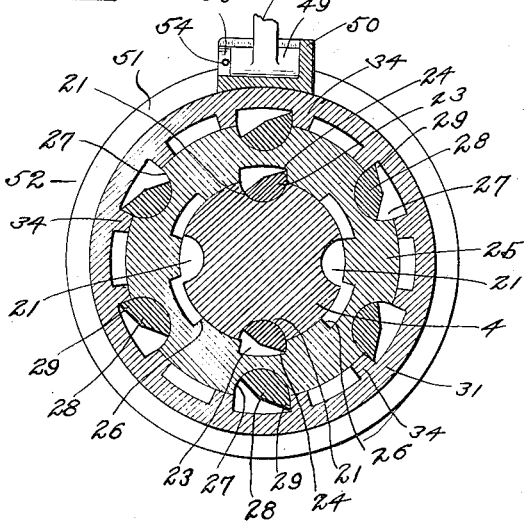
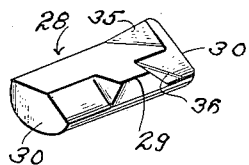
Inventor
Leon J. Campbell.
by Eugene E. Warn
Atty.

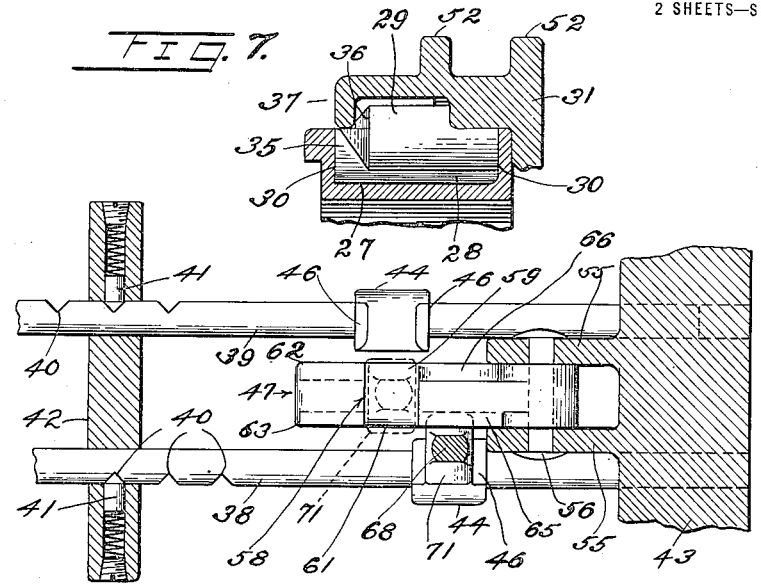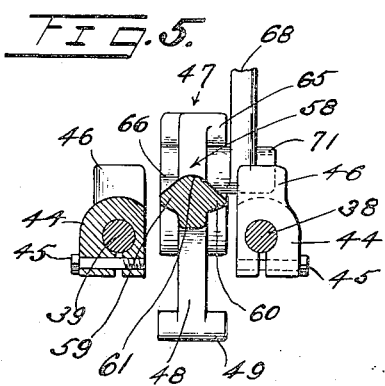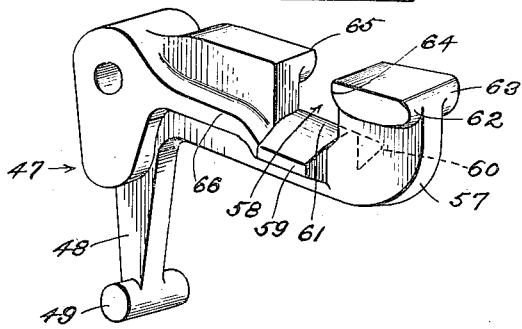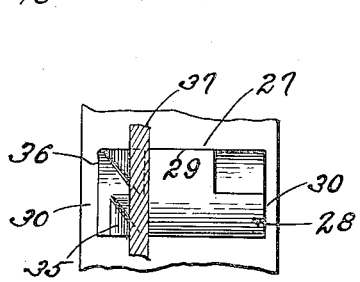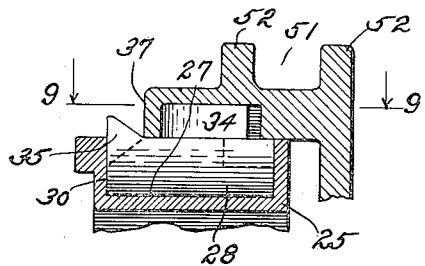

UNITED STATES PATENT OFFICE.

LEON J. CAMPBELL, OF BUCHANAN, MICHIGAN.

VARIABLE-SPEED-TRANSMISSION MECHANISM.

1,394,607.

Specification of Letters Patent.    Patented Oct. 25, 1921.

Application filed December 8, 1919. Serial No. 343,348.

*To all whom it may concern:*

Be it known that I, LEON J. CAMPBELL, a citizen of the United States, residing at Buchanan, in the county of Berrien and State of Michigan, have invented new and useful Improvements in Variable-Speed-Transmission Mechanisms, of which the following is a specification.

This invention relates to a variable speed transmission mechanism adapted for use on motor vehicles such as automobiles, trucks, and the like, and has particular reference to such a mechanism wherein all the gear wheels thereof are constantly in mesh with a set of gear wheels loosely mounted on the transmission shaft and being selectively connected therewith at the will of the operator, by keys slidably and rockably mounted on that shaft as is more particularly set forth in my copending application Serial No. 322,837, filed September 10th, 1919. In that application, I have disclosed a gear wheel loosely mounted on the clutch shaft and releasably connected therewith by keys which are maintained in unlocked positions to disconnect said gear wheel from said shaft when only the latter and the transmission shaft alined therewith are directly connected together by a set of the other keys for direct drive or what is commonly known as "high speed" so that none of the gear wheels will be rotated at such time and thus produce a silent transmission in that no humming of gear wheels takes place.

One of the objects of my present invention is to provide a key type of mechanism not only for disconnecting said gear wheel from the clutch shaft when the latter and the transmission shaft are directly connected for high speed, but also to disconnect said gear wheel from said clutch shaft each and every time the parts occupy neutral position, and thus have none of the gear wheels running at that time and produce a silent transmission when the parts are in neutral position.

The invention consists further in the matters hereinafter described and more particularly pointed out in the appended claims.

In the accompanying drawings, illustrating a variable speed transmission mechanism embodying the features of my invention—

Figure 1 is a longitudinal vertical sectional view taken through such a mechanism of the type mentioned and showing incorporated therein the features of my invention;

Fig. 2 in an enlarged transverse sectional view taken on line 2—2 of Fig. 1;

Fig. 3 is a perspective view of one of the rockably mounted keys for the gear wheel on the clutch shaft;

Fig. 4 is an enlarged top plan sectional view taken on line 4—4 of Fig. 1;

Fig. 5 is an enlarged sectional view taken on line 5—5 of Fig. 1;

Fig. 6 is a perspective view of a shift lever to be hereinafter described;

Fig. 7 is a longitudinal sectional view taken through one of said rockably mounted keys and showing the portion of the gear wheel which acts directly on said key in position after having rocked the key into locking position;

Fig. 8 is a like view of the same parts except said gear wheel is shown in position after having rocked said key into unlocking position; and Fig. 9 is a top plan section on line 9—9 of Fig. 8.

The variable speed transmission mechanism, shown in the accompanying drawings, in its general arrangement is similar to that described and claimed in my copending application, and, as shown herein, said mechanism has a shaft 1 extending into a housing or casing 2 and journaled therein on a bearing 3. Said shaft 1 at its forward end is provided with one of the members of the two-part clutch (not shown) interposed between the shaft and the crank shaft of the motor of the vehicle when said mechanism is used in an automobile. Extending into said casing from the opposite side thereof is a shaft 4 journaled therein on a bearing 5. The rear end of the shaft 4 projects beyond the casing and is coupled in a suitable manner to the propeller shaft of the vehicle, said propeller shaft extending back to the differential mechanism at the rear axle, as customary in automobile construction. The shafts 1 and 4 are alined axially, with the forward end 6 of the shaft 4 reduced and extending into the hollow inner end of the shaft 1 as shown in Fig. 1, there being roller bearings 7 interposed between such parts. Said bearings are held from endwise displacement in any suitable manner, as by annular shoulders on the shafts 1 and 4. Located in the casing 2 below the shafts 1 and 4 and arranged substantially parallel thereto, is a counter shaft 8 held against rotation by pins 9. Loosely mounted on said shaft 8 are a plurality of gear wheels 10, 11, 12, and 13, decreasing in diameter in the order named. The gear wheels 10 and 11 are spooled together, that is, they are connected together by an interposed sleeve 14, there being a bushing 15 between said sleeve and the shaft 8. Extending rearward from the gear wheel 11 is a sleeve 16, there being a bushing 17 interposed between it and the shaft 8. The gear wheels 12 and 13 are keyed to the sleeve 16 so as to rotate therewith and the other gear wheels mentioned.

Loosely mounted on the shaft 4 are a plurality of gear wheels 18, 19, and 20, the first two increasing in diameter in the order named and the last one having a diameter greater than the first one but less than the intermediate one, as shown. The gear wheel 18 is constantly in mesh with the gear wheel 11, while the gear wheel 19 is constantly in mesh with the gear wheel 12, and the gear idler (not shown) on the opposite side of the wheel 20 is constantly in mesh with a reverse shaft 8. As shown in my said copending application, the reverse idler is constantly in mesh with the gear wheel 13. The shaft 4 is provided with a plurality of longitudinally extending concave grooves or key-ways 21, 21, four in number in the type of mechanism illustrated and arranged about the shaft in the same manner as set forth in my copending application. Each two diametrically disposed key-ways 21 constitute a set, and in each key-way of one set is an elongated key 22, while in each key-way of the other set is a similar key 23, the latter being longer than the keys 22. Each key is slidably and rockably mounted in its key-way and is provided at its forward end with a locking lug 24 adapted when the key is rocked in one direction to project beyond the surface of the shaft 4 for locking thereto either one of the gear wheels with which that key operates, and when rocked in the opposite direction to be within the surface of said shaft and disconnect the gear wheel therefrom.

The shaft 1 is provided at its inner end with an enlarged annular portion 25 surrounding the adjacent end of the shaft 4 and beneath which all the key-ways 21 extend. Said portion 25 is provided with a plurality of internal locking shoulders 26 circumferentially spaced apart and to be engaged by locking lugs 24 of the keys 23, as clearly shown in Fig. 2, to connect the shafts 1 and 4 directly together when the keys 23 have been moved forward to that position. The portion 25 is further provided in the outer cylindric surface thereof with a plurality of semi-cylindric grooves or key seats 27 circumferentially spaced apart. As shown in Fig. 2, there are six of said key seats 27 and in each is rockably mounted a key 28 having the same length as the seat in which it is located and being provided between its ends with a locking lug 29 adapted when the key is rocked in one direction to project beyond the shaft portion 25 and when rocked in the opposite direction to be within the outer surface of the shaft for a purpose to be presently described. Each key 28 has its end faces 30 parallel and flat to bear against complementary faces at the ends of the keyway 27. Thus each key 28 has no endwise movement in its key seat but only rocking movement.

Slidably and rotatably mounted on the shaft 1 at its end portion 25 is a gear wheel 31 provided with gear teeth 32 constantly in mesh with the gear wheel 10. Said gear wheel 31 has its annular portion 33 surrounding the shaft portion 25 and provided with a plurality of internal locking shoulders 34 radially arranged and circumferentially spaced apart equal distances. In the form of device shown, there are twice as many shoulders 34 as there are keys 28, and when the keys are rocked into locking position with their lugs 29 projecting beyond the shaft section 25, said lugs engage locking members 34 and lock the gear wheel 31 to the shaft 1. When the keys are rocked in the opposite direction, in a manner to be presently described, the gear wheel 31 is disconnected from the shaft 1 and the latter may rotate independently of the former, and consequently no power is transmitted from the gear wheel 31 to the gear wheel 10 and the other gear wheels connected therewith. For rocking all the keys 28 simultaneously into and out of locking position, each key 28 is provided at one end with a cam face 35 inclined inward toward the body of the key and toward the opposite end thereof, as shown in Fig. 3. Said key 28 is also provided with another cam face 36 inclined inward toward the body of the key from one end of the locking lug 29 and toward the end of the key provided with the other cam face. In other words, the cam faces 35, 36 are between the locking lug 29 and the end of the key provided with the cam face 35 and inclined toward each other but offset laterally on opposite sides of the longitudinal axis of the key. The keys 28 are all arranged with their ends having the cam faces 35 facing the gear wheel 18, and the gear wheel 31 is provided with an inwardly extending annular flange 37 to coact with the cam faces for rocking the keys into and out of locking position. When the gear wheel 31 occupies the position shown in Fig. 7, it has been shifted endwise toward the gear wheel 18, and its flange 37 has been moved inward across and beyond the cam face 35 and holds the key in locking position. In such position, the lug 29 projects beyond the shaft 1, as also does the cam face 36

36, so that when the gear member 31 is shifted endwise of the shaft in the opposite direction, its flange 37 will ride over the cam face 36 and cause the key to be rocked into unlocked position, thereby withdrawing its lug 29 from engagement with the gear member 31 and disconnecting the latter from the shaft 1, as shown in Fig. 8. As shown in Fig. 9, the flange 37 has lateral movement between the cam faces for effecting the rocking of the keys. The latter are arranged, as shown in Fig. 2, so that a certain number of keys 28 when rocked into locking position will have their locking lugs 29 facing in opposite directions so that one set of keys will engage the locking shoulders 34 on one side to effect a driving of the gear member 31 by the shaft 1, while another set of keys will engage the locking lugs 34 on the outside to take up the back lash, and the same arrangement is followed with respect to the sets of keys 22 and 23. The locking lugs 34 and 29 of the several keys have flat contact faces arranged and functioning in the same manner as set forth in my said copending application and in my prior patents cited therein.

To effect the shifting of the gear member 31 endwise of the shaft 1, the following construction is provided. Slidably mounted in the casing 2, above the shaft 4, are two shift rods 38 and 39, laterally spaced apart and each having three notches 40 to be engaged by a spring pressed pin 41 mounted in the portion 42 of the casing through which the rods extend. Said pins when engaging the notches hold the rods from accidental endwise movement out of the position into which they have been shifted, there being three notches as there are three positions into which each rod may be moved in changing the speed through the transmission mechanism. The other end of each shift rod is slidably supported in an adjacent forward section 43 of the casing, as shown in Fig. 4. Each rod is provided at the same point between its ends with a shifter block 44 clamped about the rod by a screw 45 and having two upwardly projecting lugs 46, 46 spaced apart lengthwise of the rod. Interposed between the rods is a shift lever 47 having the shape shown in Fig. 6. Said lever 47 has a depending arm 48 provided at its lower end with a cylindric cross pin 49 to engage a block 50 located in an annular channel 51 provided in the gear member 31 between the annular flanges 52, 52 thereof, as shown in Figs. 1, 2, 7 and 8. To receive the cross pin, the block 50 has a cylindric recess 53 opening outward through one end of the block to permit said cross pin to be inserted thereinto and an upwardly opening slot to permit the arm 48 of the lever to extend upward therethrough. The inner end of the recess 53 is closed, and to hold the cross pin therein I provide a stop pin 54 inserted across the recess 53 at the outer end of the cross pin, as shown in Fig. 2. The lever 47 is located between lugs 55 provided on the portion 43 of the casing and is pivotally connected therewith by a horizontally arranged pivot pin 56. The other arm 57 of said lever is arranged substantially at right-angles to the arm 48, and has movement up and down between the shift rods 38, 39. Said arm 57 is provided between its ends with a transverse slot or passage-way 58 opening on opposite sides of the lever and also through the top thereof. The sides of the slot 58 are parallel and substantially straight, and at the bottom of the same are two outwardly projecting lugs 59, 60 extending laterally from the arm 57 on opposite sides thereof and having their top faces inclined upward toward each other and meeting in an edge 61 midway of the slot. The arm 57 is provided at its forward end with outwardly extending flanges 62, 63, the same being adjacent the top of the arm and extending laterally therefrom on opposite sides of the same. Each flange terminates at the slot 58, and the ends of the flanges at the slot are curved upward as at 64. The portion of the arm 57 between its pivotal point and the slot 58 has at one side an upper flange 65 forming in effect a continuation of the flange 63 and also having its end at the slot 58 curved upward in the same manner. At the opposite side of the arm 57 is an outwardly extending flange 66 having its upper face extending to and inclined gradually downward toward the bottom of the slot, as shown.

As shown in Fig. 1, the casing 2 is provided with an upwardly extending, hollow portion 67 projecting above the top wall thereof and into which extends the lower end 68 of the control lever 69, the latter having a universal connection with the casing extension 67 through the provision of a ball 70, as shown. The upper end of the lever 69 extends above the floor of the vehicle forward of the driver's seat and in position to be reached by him. I have not shown such end of the lever 69, nor have I shown the manner in which the same extends through the guide slot in the sector plate provided therefor. It will be sufficient to say that the guide slot may be in the form of an H, as customarily used. The lower end of the lever 69 is provided with a cross pin 71 made substantially triangular in shape, as shown in Figs. 1 and 5, and is designed to pass through the slot 58 in the movement of the lower end of the lever from one side of the shift lever 47 to the other, in engaging the rods 38, 39. The rod 39 is connected at one end with the set of keys 23 by a yoke 72, while the rod 38 is connected in the same manner with the other set of keys 22, as described in my said copending application.

The mechanism shown and described operates as follows: When the control lever 69 is in neutral, its lower end 71 is in the slot 58 and does not engage either of the lugs 46 on the rods 38, 39, as indicated by dotted lines in Fig. 4. The lever 48 then occupies neutral position, that is, its cross pin 49 holds the gear member 31 in a position with the keys 38 in unlocked positions, as shown in Fig. 8. The gear member 31 is thus disconnected from the shaft 1 and, as the keys 22, 23 are also held in neutral, the gear wheels 18, 19, and 20 are disconnected from the shaft 4 and no power will be transmitted from the shaft 1 to the shaft 4, even though the former be rotated by the engine. Thus, when the parts are in neutral none of the gear wheels will be rotated and a silent transmission gained. To move from neutral into first or slow speed, the handled end of the control lever 69 is grasped and moved laterally in a direction to shift its lower end 71 from the slot 58 into position between the lugs 46 on the rod 38, said lugs being directly opposite the slot at that time. The upper end of the control lever 69 is then moved rearward, causing its lower end 71 to be moved forward and beneath the flange 65 on the lever 47. As the lever end 71 moves upward in the arc of a circle, it swings the upper arm 57 of said lever 48 upward and shifts the gear member 31 inward to rock the keys 28 into locking positions and locks the gear member 31 to the shaft 1, as shown in Fig. 1. At the same time, the rod 38 is moved forward, moving therewith the keys 22 and locking the gear wheel 19 to the shaft 4, as shown in Fig. 1. Thus, power is transmitted from the shaft 1 to the shaft 4 through the gear wheels 31, 10, 12 and 19. To move back to neutral, the lower end 71 of said control lever is moved back to the slot 58, thus restoring the keys 22 to neutral and disconnecting the gear wheel 19 from the shaft 4. When at the slot 58, the lever end 71 is moved laterally into the same and, in so doing, rides over the inclined lug 60 and moves the lever arm 57 downward, thereby shifting the gear members 31 forward and rocking the keys 28 to disconnect said gear member 31 from the shaft 1. The shifting movement of said gear member 31 is not great enough at any time to disengage the gear teeth 32 from the gear wheel 10. To move from neutral into reverse, the lever end 71 is again engaged with the rod 38 and moved rearward, thus moving the keys 22 in that direction to lock the gear wheel 20 to the shaft 4. Said lever end 71 moves under and into engagement with the flange 63 on the lever arm 57, moves the same upward, and effects the locking of the gear member 31 to the shaft 1, as before.

In returning to neutral, the lever end 71 rides over the inclined lug 60 in going into the slot 58, and shifts the gear member 31 to unlock the same from the shaft 1. To gain second speed, the lever end 71 is moved out of the slot 58 to engage the lugs 46 on the other rod 39, and moved rearward to cause the lugs 23 to lock the gear wheel 18 to the shaft 4. At the same time, the lever end 71 moves under and into engagement with the flange 62 on the lever arm 57, swinging the same upward and shifting the gear member 31 rearward and locking the same by the keys 28 to the shaft 1. Power is then transmitted from the shaft 1 to the shaft 4 through the gear member 31, gear wheels 10, 11, and 18. To move into high speed or direct drive, the lever end 71 is moved forward to move the keys 23 beneath the shaft portion 25 and lock the same to the shaft 1, thereby gaining a direct connection between said shafts 1 and 4 without the power being transmitted through any of the gear wheels. During such movement, the lever end 71 rides over the base flange 66, swinging the lever arm 57 downward and shifting the gear member 31 to disconnect it from the shaft 1. Thus, when the shafts 1 and 4 are directly connected, none of the gear wheels are locked to the shafts, and consequently a silent transmission is produced, as none of the gear wheels are running at that time and therefore no humming of gears takes place.

Manifestly, by the invention described the gear wheels are only rotating when transmitting power and at all other times are idle and are not turning and a silent transmission gained. This is when either in neutral or direct.

While I have shown and described in detail a form of structure embodying the features of my invention, it is of course to be understood that the details of construction and arrangement of parts shown and described may be variously changed and modified without departing from the spirit and scope of my invention.

I claim as my invention:

1. A variable speed transmission mechanism, comprising a plurality of gear wheels constantly in mesh, with the speed gear wheels loosely mounted on the driven shaft and the drive gear wheel loosely mounted on the driving shaft, means for selectively connecting the speed gear wheels to the driven shaft and for directly connecting the driving and driven shafts together, and means actuated with said first named means for disconnecting the drive gear wheel from the driving shaft each time the speed gear wheels are disconnected from the driven shaft and also when the driving and driven shafts are directly connected together.

2. A variable speed transmission mechanism, comprising a plurality of gear wheels constantly in mesh, with the speed gear wheels loosely mounted on the driven shaft and the drive gear wheel loosely mounted on the driving shaft, means including keys on the driven shaft for selectively connecting the speed gear wheels thereto and for directly connecting the driving and driven shafts together, and means actuated with said keys for disconnecting the drive gear wheel from the driving shaft each time the speed gear wheels are disconnected from the driven shaft and also when the driving and driven shafts are connected together by the keys.

3. A variable speed transmission mechanism, comprising a plurality of gear wheels constantly in mesh, with the speed gear wheels loosely mounted on the driven shaft and the drive gear wheel loosely mounted on the driving shaft, means including keys slidably and rockably mounted on the driven shaft for selectively connecting the speed gear wheels thereto and for directly connecting the driving and driven shafts together, and means actuated with said keys for disconnecting the drive gear wheel from the driving shaft and the speed gear wheels from the driven shaft when the driving and driven shafts are directly connected together by the keys.

4. A variable speed transmission mechanism, comprising a plurality of gear wheels constanly in mesh, with the speed gear wheels loosely mounted on the driven shaft and the drive gear wheels loosely mounted on the driving shaft, means including two sets of keys, one set on the driven shaft for selectively connecting the speed gear wheels thereto and for directly connecting the driving and driven shafts together, the other set of keys on the driving shaft for releasably connecting the drive gear wheel thereto, and means for actuating both sets of keys simultaneously for disconnecting the drive gear wheel from the driving shaft each time the speed gear wheels are disconnected from the driven shaft and also when the driving and driven shafts are directly connected together.

5. A variable speed transmission mechanism, comprising a plurality of gear wheels constantly in mesh, with the speed gear wheels loosely mounted on the driven shaft and the drive gear wheel slidably and loosely mounted on the driving shaft, keys rockably mounted on the driving shaft, means for rocking said keys into and out of locking engagement with said drive gear wheel upon the sliding of the same, keys slidably and rockably mounted on the driven shaft for selectively connecting the speed gear wheels thereto and for directly connecting the driving shaft and driven shaft together, and a single operating member for actuating the keys on the driven shaft and simultaneously sliding the drive gear wheel on the driving shaft to disconnect the drive gear wheel from said driving shaft when the speed gear wheels are disconnected from the driven shaft and also when the driving and driven shafts are directly connected together.

6. A variable speed transmission mechanism, comprising a plurality of gear wheels constantly in mesh, with the speed gear wheels loosely mounted on the driven shaft and the drive gear wheel slidably and loosely mounted on the driving shaft, keys rockably mounted on the driving shaft, said drive gear wheel and said keys having coacting parts for rocking said keys into and out of engagement with said drive gear wheel upon the sliding of the same, two sets of keys on the driven shaft for selectively connecting the speed gear wheels thereto and for directly connecting the driving and driven shafts together, a member connected with said drive gear wheel for sliding the same, and a control lever to be shifted into connection with either set of keys on the driven shaft and to actuate said member for sliding said drive gear wheel to disconnect the same from the driving shaft when the speed gear wheels are disconnected from the driven shaft and also when the driving and driven shafts are directly connected together.

7. A variable speed transmission mechanism, comprising a plurality of gear wheels constantly in mesh, with the speed gear wheels loosely mounted on the driven shaft and the drive gear wheel loosely and slidably mounted on the driving shaft, keys rockably mounted on the driving shaft, said drive gear wheel and said keys having coacting parts to rock the keys into and out of engagement with said drive gear wheel upon the sliding of the same, a pivoted bell crank lever having one arm connected with said drive gear wheel for sliding the same, and the other arm provided with a slot extending therethrough, two sets of keys on the driven shaft for selectively connecting the drive gear wheel thereto and for directly connecting the driving and driven shafts together, and a control lever adapted to be shifted through said slot for connection with either set of keys on the driven shaft and to actuate said bell crank lever to slide the drive gear wheel on the driving shaft.

8. A variable speed transmission mechanism, comprising a plurality of gear wheels constantly in mesh, with the speed gear wheels loosely mounted on the driven shaft and the drive gear wheel loosely mounted on the driving shaft, keys rockably mounted on the driving shaft, said drive gear wheel and said keys having coacting parts to rock the keys into and out of locking engagement with the drive gear wheel upon the sliding of the same, two sets of keys slidably and rockably mounted on the driven shaft for selectively connecting the drive gear wheel thereto and for directly connecting the driving and driven shafts together, a shift rod for each set of keys, a pivotally mounted bell crank lever having one arm arranged between said shift rods and provided with a slot extending therethrough and the other arm connected with said drive gear wheel for sliding the same, and a control lever to be shifted through said slot for connection with either of the shift rods and to actuate said bell crank lever to slide the drive gear wheel on the driving shaft.

9. A variable speed transmission mechanism, comprising a plurality of gear wheels constantly in mesh, with the speed gear wheels loosely mounted on the driven shaft and the drive gear wheel loosely and slidably mounted on the driving shaft, keys rockably mounted on the driving shaft, said drive gear wheel and said keys having coacting parts to rock said keys into and out of locking engagement with said drive gear wheel upon the sliding of the same, two sets of keys slidably and rockably mounted on the driven shaft for selectively connecting the speed gear wheels thereto and for directly connecting the driving and driven shafts together, a shift rod for each set of keys, a pivotally mounted bell crank lever having one arm connected with said drive gear wheel for sliding the same and the other arm between said shift rods and having a slot extending therethrough, and a control lever to be shifted through said slot to engage the shift rods on opposite sides thereof, said lever arm having laterally projecting parts at the sides thereof to be engaged by said control lever to slide said drive gear wheel in the shifting of the keys on the driven shaft.

10. A variable speed transmission mechanism, comprising a plurality of gear wheels constantly in mesh, with the speed gear wheels loosely mounted on the driven shaft and the drive gear wheel slidably and loosely mounted on the driving shaft, keys rockably mounted on the driving shaft, said drive gear wheel and said keys having coacting parts to rock the keys into and out of locking engagement with said drive gear wheel upon the sliding of the same, two sets of keys slidably and rockably mounted on the driven shaft for selectively connecting the speed gear wheels thereto and directly connecting the driving and driven shafts together, a shift rod for each set of keys, a pivotally mounted bell crank lever having one arm between said rods and provided with a slot extending therethrough and the other arm connected with said drive gear wheel for sliding the same, a control lever having its inner end to be shifted through said slot to engage either one of the shift rods on opposite sides thereof, said control lever having a cross-pin at its lower end to coact with flanges on the sides of the lever arm provided with said slot and with laterally projecting lugs at the base of said slot and having inclined surfaces arranged transverse to said slot for actuating said bell crank lever to shift the drive gear wheel on the driving shaft.

In testimony that I claim the foregoing as my invention, I affix my signature this 3rd day of December, A. D. 1919.

LEON JAY CAMPBELL.